United States Patent [19]

Doring

[11] Patent Number: 4,564,056
[45] Date of Patent: Jan. 14, 1986

[54] VALVE FOR WHEELS FOR TUBELESS BICYCLE TIRES

[75] Inventor: Heinrich Doring, Arolsen, Fed. Rep. of Germany

[73] Assignee: Continental Gummi-Werke Aktiengesellschaft, Hanover, Fed. Rep. of Germany

[21] Appl. No.: 543,267

[22] Filed: Oct. 19, 1983

[30] Foreign Application Priority Data

Oct. 21, 1982 [DE] Fed. Rep. of Germany ....... 3238928

[51] Int. Cl.$^4$ ............................................. B60C 29/00
[52] U.S. Cl. ........................... 152/427; 152/DIG. 13; 301/5 VH
[58] Field of Search ................ 301/5 VH, 65, 63 PW; 152/DIG. 13, DIG. 7, 427–429, DIG. 11; 137/223

[56] References Cited

U.S. PATENT DOCUMENTS

| | | | |
|---|---|---|---|
| 2,248,489 | 7/1941 | Broecker | 137/223 |
| 2,874,749 | 2/1959 | Brink | 152/427 |
| 3,610,312 | 10/1971 | Kilmarx | 152/427 |
| 3,712,326 | 1/1973 | Thacker | 152/427 X |
| 3,830,277 | 8/1974 | Lejeune | 152/427 |

Primary Examiner—David A. Scherbel
Attorney, Agent, or Firm—Becker & Becker, Inc.

[57] ABSTRACT

A valve for wheels for pneumatic tubeless bicycle tires. The wheel has a wellbase or drop-center rim and a valve opening in the base of the wellbase for such a valve. For simple installation of the valve, the valve body is provided on the outlet end with a cylindrical projection, the outer dimensions of which correspond to the inner dimensions of a valve opening recess, so that in the installed state the valve body has a surface which is flush with the base of the wellbase of the rim.

12 Claims, 6 Drawing Figures

VALVE FOR WHEELS FOR TUBELESS BICYCLE TIRES

BACKGROUND OF THE INVENTION

1. Field of the Invention

The present invention relates to a valve for wheels for tubeless bicycle tires, especially for wheels having a wellbase or drop-center rim.

2. Description of the Prior Art

Since tubeless tires have been known for a long time for motor vehicles, there has also been proposed in recent times to use tubeless tires for bicycles. Accordingly, there has become necessary to provide a suitable valve for a wheel rim which is to be used for a tubeless tire. Although one might think to also use the so-called snap-in valve, which is widely known for automobile rims, with the rims of bicycles; however, this valve has proven to be unavailing due to the overall dimensions of the curved valve head, which has enough place or space available for installation in the interior of an automobile rim.

An object of the present invention therefore is to develop a valve for wheels for tubeless bicycle tires; such valve on the one hand provides a reliable seal, and on the other hand can also be easily installed.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
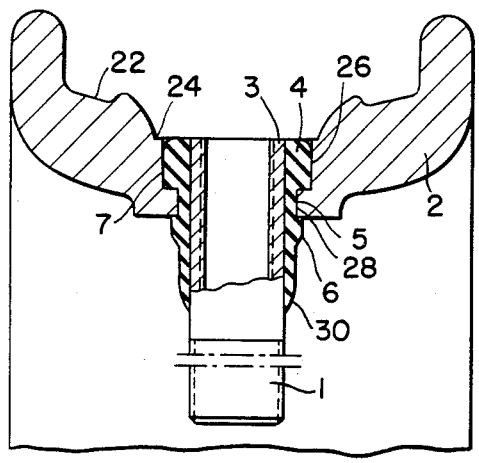
FIG. 1 is a radial partial section through a rim in which there has been installed one inventive embodiment of a valve body comprising a metal sleeve and a rubber covering, with the valve body having a snap-in construction.

The valve of the present invention is characterized primarily in that the valve body, on the outlet end thereof, i.e. the radially outer end in the installed state, is provided with a circumferential projection, the outer dimensions of which correspond to the inner dimensions of a recess located in the base of the wellbase of the rim in the vicinity of the valve opening, so that in the installed state the valve body has a surface which is flush with the base of the wellbase of the rim.

As a result of being recessed in the base of the wellbase of the rim, and as a result of having a surface which is flush with the base of the wellbase, the valve of the present invention offers the advantage that the valve in no way obstructs or hinders when a bicycle tire is being mounted or removed. Furthermore, with narrow bicycle rims there is achieved the advantage that the valve body is not in the way of the tire beads in the mounted position thereof on the rim.

Having a surface of the valve body being flush with the base of the wellbase of the rim, according to one preferred embodiment, can be achieved by providing the outlet end of the valve body with a cylindrical projection, and by providing the rim in the region of the valve opening with a corresponding stepped bore. With this first preferred embodiment, the valve body has a so-called snap-in construction; in other words, the valve body is connected to the rim merely by being pressed in, and no screw connection is necessary. The valve body can comprise a metal sleeve into which a customary valve insert can be screwed; the valve body can also comprise a rubber elastic covering of which at least the projection, which is located at the end of the valve body, a sealing groove which is disposed adjacent thereto and a sealing bead which is next to the groove are made. The thickness of the sealing bead is such that the valve body can only be pressed from the inside through the valve opening of the rim when force is exerted thereon, so that due to the rubbery elastic properties of the covering in the operating position, an airtight seating of the valve body in the rim is assured.

With the above described valve body, the metal sleeve can have the same diameter over the entire length thereof and can extend to the end of the rubber projection. Thus, at the outlet end of the valve, the metal sleeve can be flush with the projection. However, in the vicinity of the projection, the metal sleeve can also have a larger diameter or widened portion, so that a greater reliability against a forcible pulling out of the valve body from the rim is achieved. If there is important that the internal pressure of an inflated tire should participate in the sealing effect of the valve body, the metal sleeve can already end in the vicinity of the sealing groove or the sealing bead.

Pursuant to a further preferred embodiment of the present invention, the valve body is made exclusively of synthetic material, and is attached to the rim, after being pressed into the valve opening thereof, by means of a circumferential bead which is disposed below a circumferential groove. To achieve an airtight seal, a sealing ring, for example an O-ring, is disposed between the rim and the ring-shaped surface of the projection.

Pursuant to yet another preferred embodiment of the present invention, the valve body is made exclusively of metal, and a sealing ring is again used for sealing purposes in the vicinity of the ring-shaped surface of the projection. Attachment to the rim is effected by a screw connection by means of a hexagonal nut or with the aid of an internal thread which is located in the rim passage or opening. Alternatively, instead of the internal threads on the rim, the valve body can be divided into two parts, namely a stem, and a holding piece which has a collar and on which there can be placed a sealing ring; to attach the valve body to the rim, these two parts are screwed together.

The bicycle wheel for pneumatic tubeless tires may have a wellbase or drop-center rim with a valve opening in the base of the wellbase for a valve which comprises a valve body having one or more of the aforementioned inventive features.

DESCRIPTION OF PREFERRED EMBODIMENTS

Referring now to the drawings in detail, the valve body 1 illustrated in FIG. 1 is located in a passage through the rim 2 in the middle of the wellbase or dropcenter. The valve body 1 comprises an inner middle sleeve 3 having an internal thread for screwing in place a valve insert which, to facilitate ilustration, is not shown. The valve body 1 also comprises a rubber covering 30 which in the upper region of the metal sleeve 3 is fixedly connected therewith. A cylindrical projection 4 is formed by the rubber covering. The projection 4 ends at the metal sleeve 3; on the other side, a sealing groove 5 and a sealing bead 6 adjoin the projection 4.

The external dimensions of the projection 4 correspond to the inner dimension 26 of an opening in the rim 2, in the present case, a stepped bore 7 formed by inwardly projecting flange 28, so that after installation, the valve body 1 forms a flush surface 24 with the base 22 of the wellbase. There is also important when other shapes of the opening are selected, such as a conical opening, that flush surfaces be obtained. The thickness of the rubber covering in the vicinity of the sealing groove 5 and the sealing bead 6 is such that, on the one hand, the valve body 1 can be pressed into the valve opening without damaging the material, and that, on the other hand, the rubber in the operating position of the valve body 1 presses against the rim 2 with enough force to achieve a reliable sealing effect.

Figure 2:
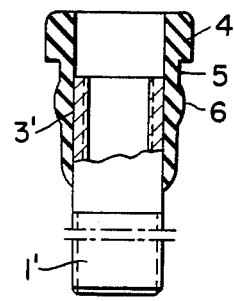
FIG. 2 is an inventive embodiment of a valve body similar to that of FIG. 1, but with a shorter metal sleeve.

The valve body 1' illustrated in FIG. 2 differs from that described with reference to FIG. 1 in that the metal sleeve 3' already ends in the region of the sealing groove 5 or even the sealing bead 6, so that when a tire mounted on the wheel is inflated, the internal air pressure reinforces the sealing function of the sealing groove 5 or the sealing bead 6 at the valve body 1'.

Figure 3:
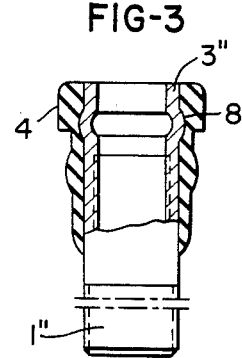
FIG. 3 is an inventive embodiment of a valve body similar to that of FIG. 1, but with a larger diameter of the metal sleeve in the vicinity of the projection.

The valve body 1" shown in FIG. 3 differs from that of FIG. 1 in that the metal sleeve 3" is provided in the vicinity of the projection 4 with a widened portion 8 having a greater diameter, so that the reliability against the valve body 1" being forcibly pulled out is increased.

Figure 4:
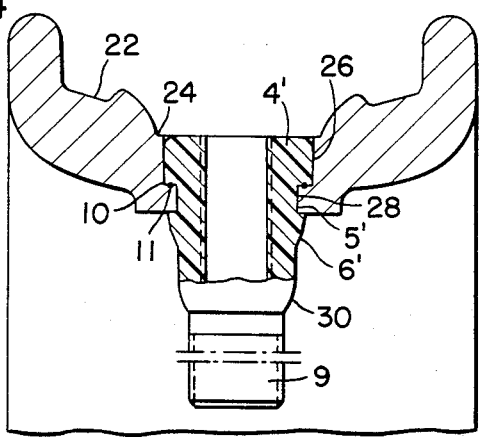
FIG. 4 is a radial partial section through a rim in which there has been inserted one inventive embodiment of a valve body which is made of synthetic material and has a snap-in construction, with a sealing ring being disposed between the rim and the valve body.

FIG. 4 illustrates a rim 2 with a valve body 9 which is made of synthetic material and has a snap-in construction. Again, a groove 5' and a bead 6' are disposed below a projection 4'. To achieve a reliable sealing, an O-ring 10 is disposed between the rim 2 and the ring-shaped surface of the projection 4' of the valve body. In order to satisfactorially fix the position of the sealing ring 10, annular grooves 11 can be provided in the projection 4' and in the rim 2.

Figure 5:
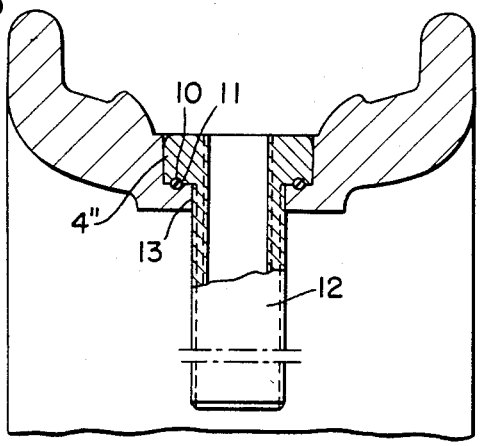
FIG. 5 is a radial partial section through a rim in which there has been inserted another inventive embodiment of a valve body which in this case is made of metal, with sealing being effected by means of a sealing ring and a screw connection.

FIG. 5 shows a rim having inserted therein a metal valve body 12. At the end of a sleeve 3 of the valve body 12 there is again provided a projection 4". Attachment to the rim 2 is effected by screwing. There may be included a hexagonal nut for installation of the valve body in the rim. However, to eliminate a hexagonal nut, the opening of the rim is provided with an internal thread 13, which can already be formed during casting. A sealing ring 10 again performs the sealing function.

Figure 6:
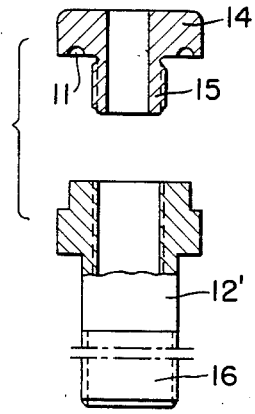
FIG. 6 shows another inventive embodiment of a metal valve body which is in two pieces.

The valve body 12' of FIG. 6 differs from the preceding embodiments by being divided into two pieces, namely a stem 16 and a holding piece 14 which forms a projection and has a collar 15. Attachment to the rim 2 is effected by screwing the two pieces together; sealing is effected by means of a sealing ring in the vicinity of the annular groove 11. The diameter of the stem in the vicinity adjacent to the rim is greater than the diameter of the valve opening in the rim. Instead of screwing together the collar 15 and the stem 16, a snap-in connection can also be provided; for example, the stem 16 can have internal circumferential grooves with which beads of the collar 15 can mesh.

The valve bodies of FIGS. 5 and 6 can also be made of a suitable synthetic material.

The present invention is, of course, in no way restricted to the specific disclosure of the specification and drawings, but also encompasses any modifications within the scope of the appended claims.

What we claim is:

1. A valve for a wheel for a tubeless bicycle tire having mounted beads, said wheel having a wellbase including a base of a narrow bicycle rim which is provided with a valve opening for receiving said valve sealingly therein regardless of overall dimensional limitations thereof; said vlave comprising:

a valve body having two end portions, with the axially outer one of said end portions being provided with a cylindrical projection having an outer dimension; the base of said wellbase of said rim of said wheel being provided with a valve opening recess having an inner dimension, and the outer dimension of said cylindrical projection corresponds to the inner dimension of said valve opening recess in such a way that in the installed state of said valve, the axially outer end portion of said valve body is flush with the base of said well base of said rim so that said valve body is kept out of the way of the tubeless tire beads in the mounting position thereof on the narrow bicycle rim.

2. A valve according to claim 1, in which said valve opening in said wellbase of said rim is provided as a stepped bore, which includes said valve opening recess, for assuring said flush alignment of said valve body with the base of said wellbase.

3. A valve according to claim 1, in which said valve body has a snap-in valve construction.

4. A valve according to claim 3, in which said valve body includes a metal sleeve, and radially outwardly thereof a rubber elastic covering which forms said projection, a sealing groove disposed adjacent to said projection, and a sealing bead disposed adjacent to said groove and remote from said projection.

5. A valve according to claim 4, in which said metal sleeve has two end portions, with the axially outer one of said end portions in an installed state in said rim, having a surface which is flush with said projection and hence with the base of said wellbase.

6. A valve according to claim 4, in which said metal sleeve extends axially outwardly a predetermined distance.

7. A valve according to claim 4, in which said metal sleeve has two end portions, with the axially outer one of said end portions, being provided with a widened portion.

8. A valve according to claim 2, in which said valve body has a snap-in valve construction and is made exclusively of synthetic material; in which said projection includes a ring-shaped surface which extends substantially perpendicular to the longitudinal direction of said valve; which includes a sealing ring for placement between said ring-shaped surface and said rim when said valve is in an installed state; and in which said valve body includes a sealing groove disposed adjacent to and radially inwardly of said projection, and a circumferential bead disposed adjacent to and inwardly of said groove remote from said projection; said bead serving for fixation of said valve body in said rim.

9. A valve according to claim 2, in which said projection includes a ring-shaped surface which extends substantially perpendicular to the longitudinal direction of said valve; which includes a sealing ring for placement between said ring-shaped surface and said rim when said valve is in an installed state.

10. A valve according to claim 2, in which said projection includes a ring-shaped surface which extends substantially perpendicular to the longitudinal direction of said valve; which includes a sealing ring for placement between said ring-shaped surface and said rim when said valve is in an installed state; and in which said valve opening of said rim is provided with an internal thread for installation of said valve body in said rim.

11. A valve according to claim 2, in which said valve body includes two parts, namely a first part and a second part; said first part comprises a collar and connected thereto a holding piece which forms said cylinder projection and is provided with a groove for receiving a sealing ring; said second part comprises a stem; said first and second parts are adapted to be screwed together.

12. In combination with a bicycle wheel for a pneumatic tubeless tire having mounting beads, which wheel has a wellbase including a base of a narrow bicycle rim which is provided with a valve opening in the base of the wellbase, a valve which comprises:
 a valve body having two end portions, with the axially outer one of said end portions being provided with a cylinderal projection having an outer dimension; the base of said wellbase of said rim of said wheel being provided with a valve opening recess having an inner dimension and the outer dimension of said cylindrical projection corresponds to the inner dimension of said valve opening recess in such a way that in the installed state of said valve, the axially outer end portion of said valve body is flush with the base of said wellbase of said rim so that said valve body is kept out of the way of the tubeless tire beads in the mounting position thereof on the narrow bicycle rim.

* * * * *